United States Patent
Kato et al.

(10) Patent No.: US 8,542,948 B2
(45) Date of Patent: Sep. 24, 2013

(54) IMAGE PROCESSING APPARATUS AND METHOD

(75) Inventors: Yasuhiro Kato, Saitama (JP); Shinji Shiraga, Yokohama (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 12/574,010

(22) Filed: Oct. 6, 2009

(65) Prior Publication Data

US 2010/0085420 A1    Apr. 8, 2010

(51) Int. Cl.
*G06K 9/32*      (2006.01)

(52) U.S. Cl.
USPC .......................................................... 382/294

(58) Field of Classification Search
USPC ................ 345/683, 949, 950, 953, 958, 959, 345/960; 348/25, E5.065; 375/E7.085, E7.086; 382/294; 463/50, 52, 53, 54
See application file for complete search history.

(56) References Cited

U.S. PATENT DOCUMENTS

| | | | | | |
|---|---|---|---|---|---|
| 4,357,624 A | * | 11/1982 | Greenberg | ..................... | 348/578 |
| 2006/0013495 A1 | * | 1/2006 | Duan et al. | ..................... | 382/235 |
| 2008/0152223 A1 | * | 6/2008 | Maeda | .......................... | 382/168 |
| 2009/0309956 A1 | * | 12/2009 | Hawkins et al. | ........... | 348/14.08 |

FOREIGN PATENT DOCUMENTS

| | | | |
|---|---|---|---|
| JP | 10-210364 A | | 8/1998 |
| JP | 11096376 A | * | 4/1999 |
| JP | 2004-260823 A | | 9/2004 |
| JP | 2005-202706 | | 7/2005 |
| JP | 2006-023983 A | | 1/2006 |

\* cited by examiner

*Primary Examiner* — Gregory F Cunningham
(74) *Attorney, Agent, or Firm* — Canon U.S.A., Inc., IP Division (57) ABSTRACT

An image processing apparatus obtains a difference between a partial region of an input image and a partial region of a background image, stored in a storage device, corresponding to the partial region of the input image, determines whether each partial region of the input image is a moving body region or a background region based on the difference, and combines the partial region of the input image determined as the background region and the partial region of the background image corresponding to the partial region of the input image to update the background image.

10 Claims, 7 Drawing Sheets

IMAGE PROCESSING APPARATUS AND METHOD

BACKGROUND OF THE INVENTION

1. Field of the Invention

The present invention relates to an image processing apparatus and an image processing method.

2. Description of the Related Art

In a video conference, to preferentially display a background image with a degree of importance higher than a person image like a whiteboard image, there is a demand for removing a person image which is a foreground from an image. A technique of generating an image of only a background from a plurality of pieces of image data is discussed in Japanese Patent Application Laid-Open No. 2005-202706.

In the case of a whiteboard image, it is important to always display latest information depicted on a whiteboard, and it is necessary to generate a latest background image. In the related art described above, a latest background image may not always generated depending on a selected reference image or a result of retrieval of an image to be replaced as a background.

SUMMARY OF THE INVENTION

The present invention is directed to an image processing apparatus capable of generating a latest background image in a captured image.

According to an aspect of the present invention, an image processing apparatus includes an image input unit configured to input an image, a region determination unit configured to obtain a difference between a partial region of an input image input by the image input unit and a partial region of a background image, stored in a storage device, corresponding to the partial region of the input image and to determine whether each partial region of the input image is a moving body region or a background region based on the difference, and an updating unit configured to combine the partial region of the input image determined as the background region by the region determination unit and the partial region of the background image corresponding to the partial region of the input image to update the background image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
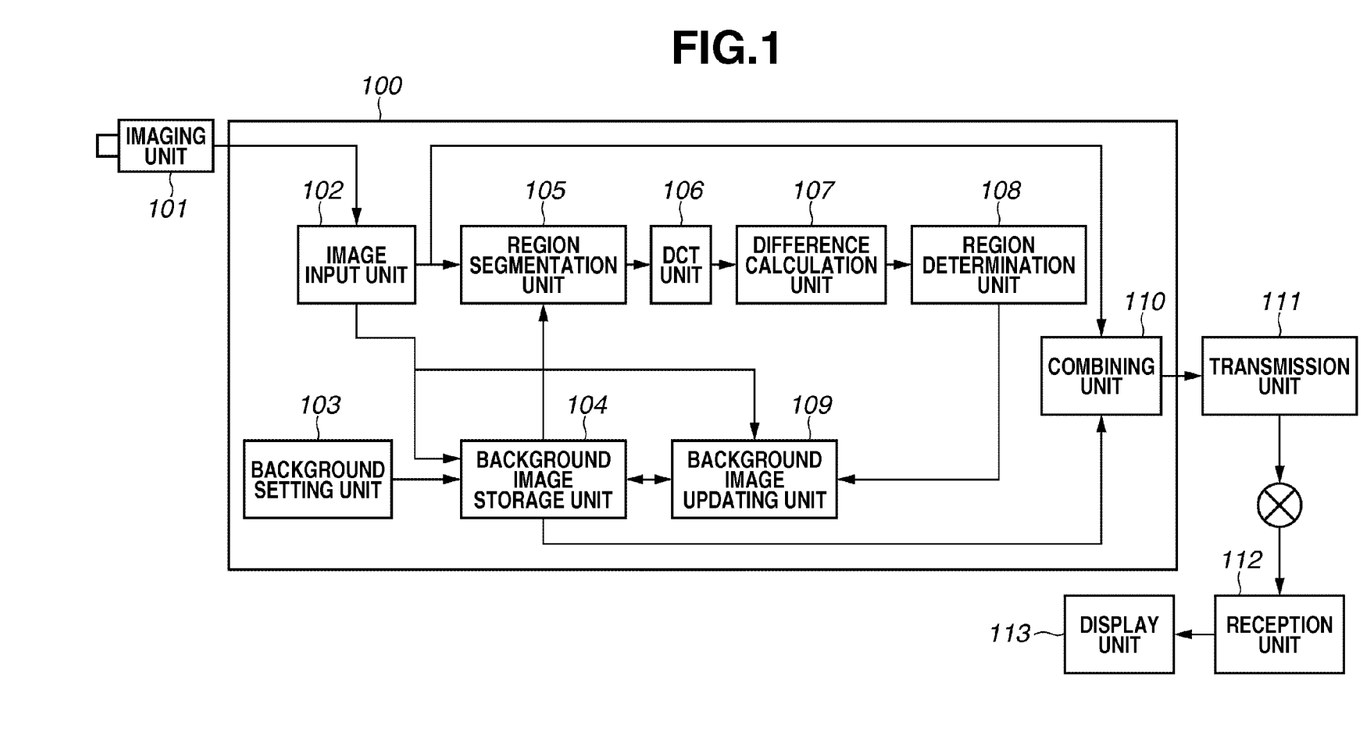
FIG. 1 is a view illustrating an example of a configuration of a video conference system according to a first exemplary embodiment of the present invention.

FIG. 1 is a view illustrating an example of a configuration of a video conference system according to a first exemplary embodiment of the present invention. In the video conference system according to the present exemplary embodiment, an imaging unit 10, an image processing apparatus 100, and a transmission unit 111 are connected to a display side via a network. In FIG. 1, the transmission unit 111 is depicted outside the image processing unit 100, but the transmission unit 111 may be contained in the image processing unit 100. In the present exemplary embodiment, for simplification of description, the transmission unit 111 is described as an internal component of the image processing apparatus 100.

The display side includes a display unit 113 and a reception unit 112. The reception unit 112 receives a background image and a combined image from the image processing apparatus 100. The display unit 113 displays the background image and the combined image received by the reception unit 112. The display side is configured by, for example, a computer.

The imaging unit 101 is located while being directed toward a whiteboard (not illustrated), and an imaging range thereof is adjusted to capture an image of the entire range of the whiteboard as a frame.

The image processing apparatus 100 includes an image input unit 102, a background setting unit 103, a background image storage unit 104, which is an example of a storage device, a region segmentation unit 105, a discrete cosine transform (DCT) unit 106, a difference calculation unit 107, a region determination unit 108, a background image updating unit 109, a combining unit 110, and the transmission unit 111. In the present embodiment, these components are described as implemented in the image processing apparatus as hardware but may be implemented in the image processing apparatus as software (a program) executed by a central processing unit (CPU). In this case, the CPU executes a program stored in a storage device such as a read only memory (ROM) or a hard disk drive (HDD), and so functions (excluding the background image storage unit 104) of the image processing apparatus illustrated in FIG. 1 and a flowchart, which will be described below, are performed.

The image input unit 102 receives and inputs, from the imaging unit 101, an image captured by the imaging unit 101. The background image storage unit 104 stores an image composed only of a background. The background setting unit 103 performs initial setting of a background. The region segmentation unit 105 segments the input image and the background image stored in the background image storage unit 104 into regions in units of block. The DCT unit 106 performs DCT processing on respective segmented regions (partial regions) of the input image and the background image stored in the background image storage unit 104 and decomposes the regions into spatial-frequency components.

The difference calculation unit 107 calculates a difference between the spatial-frequency component of the input image region and the spatial-frequency component of the corresponding background image region. The region determination unit 108 determines whether a region in which the difference is calculated is a moving body region or a background region based on the difference. The background image updating unit 109 composes the region determined as the background region by the region determination unit 108 and a corresponding region of the background image stored in the background image storage unit 104 at a combining ratio that is previously determined or set. The combining unit 110 combines the updated background image and the input image at the combining ratio, which is previously determined or set.

Figure 2:
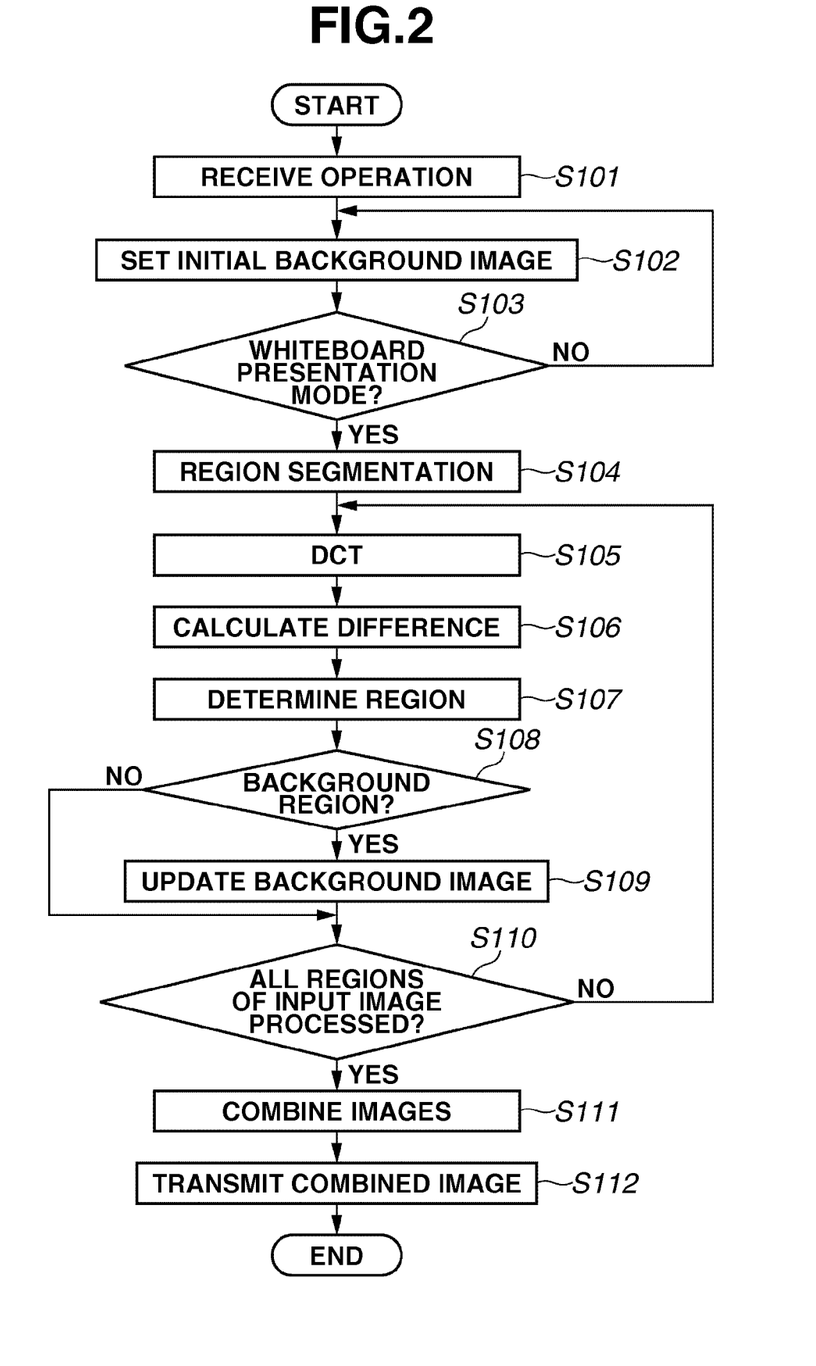
FIG. 2 is a flowchart illustrating an example of processing performed by an image processing apparatus according to the first exemplary embodiment.

An operation of the image processing apparatus 100 configured as described above will be described below. An example of a case in which description is made using a whiteboard during a video conference will be described. FIG. 2 is a flowchart illustrating an example of processing performed by the image processing apparatus according to the first exemplary embodiment.

Figure 3:
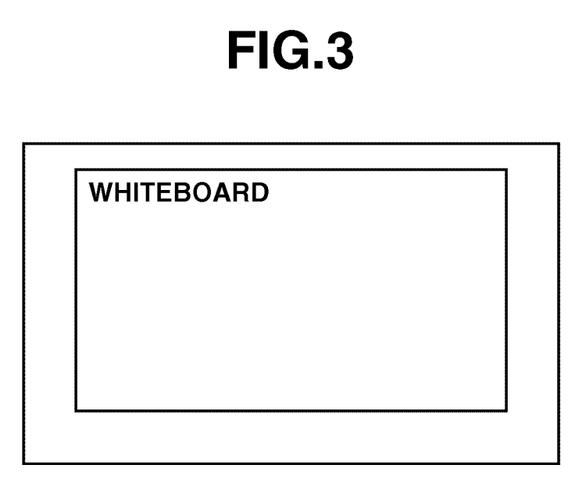
FIG. 3 is a view illustrating an example of an initial background image.

In step S101, the background setting unit 103 receives an operation by an operator and detects that an initial background image setting mode is set up according to the operation. In step S102, in the initial background setting mode, the background setting unit 103 receives an image of only a whiteboard captured by the imaging unit 101 from the imaging unit 101 and stores the received image as an initial background image, in which a moving body such as a person is not present, in the background image storage unit 104. FIG. 3 is a view illustrating an example of the initial background image. The initial background image is an image in which only a whiteboard is included in a frame as illustrated in FIG. 3. The background setting unit 103 may store an image input from the image input unit 102 in the background image storage unit 104 as an initial background image at the time of the initial background setting mode. The background setting unit 103 may store an average image of several consecutive frames input from the image input unit 102 or a median image in which middle values of respective pixels are included in the background image storage unit 104 as an initial background image at the time of the initial background setting mode.

When the initial background image is stored in the background image storage unit 104 by the background setting unit 103, the image processing apparatus 100 is automatically switched to a whiteboard presentation mode. The whiteboard presentation mode is a mode corresponding to a case in which a person stands in front of the whiteboard and starts to give a presentation. Hereinafter, what moves within an image like a person is referred to as a moving body.

In step S103, the image processing apparatus 100 determines whether the operation mode is the whiteboard presentation mode. The image processing apparatus 100 proceeds to step S104 when the operation mode is the whiteboard presentation mode and returns to processing of step S102 when the operation mode is not the whiteboard presentation mode.

Figure 4:
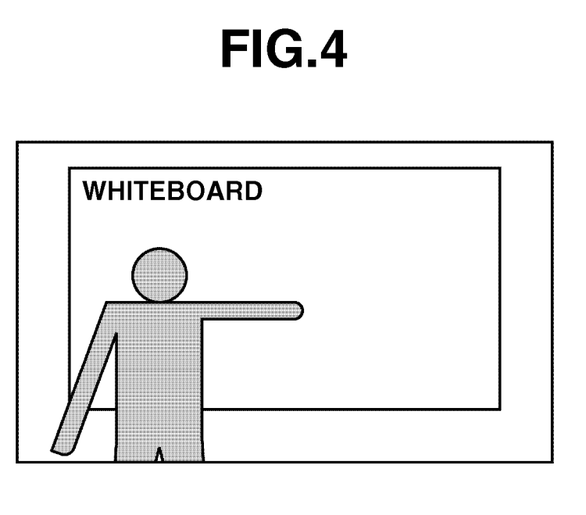
FIG. 4 is a view illustrating an example of an image in which a whiteboard and a person are contained in the same frame.

When the operation mode is switched to the whiteboard presentation mode, an image in which a whiteboard and a person are included within the same frame as illustrated in FIG. 4 is first input from the image input unit 102. FIG. 4 is a view illustrating an example of an image in which a whiteboard and a person are included within the same frame.

In step S104, the region segmentation unit 105 segments an image, input from the image input unit 102, in which a moving body is imaged, and a background image stored in the background image storage unit 104 into regions in units of block. The region segmentation unit 105 segments the image into regions in units of a block composed of N×N pixels (e.g., in units of a block composed of 8×8 pixels).

Subsequently, in step S105, the DCT unit 106 selects and extracts regions of the same location of the respective segmented regions from the input image and the background image and performs DCT processing on each region. The DCT processing refers to a discrete cosine transform (DCT), which is used for image coding of Joint Photographic Experts Group (JPEG), to transform a discrete signal into a frequency-domain signal. With the DCT processing, the regions can be decomposed into spatial-frequency components, and the respective frequency components can be obtained as coefficients.

Next, in step S106, the difference calculation unit 107 calculates a difference between the region of the input image in which the DCT processing is performed and the region of the background image in which the DCT processing is performed. When the DCT processing of the regions is performed, pixel information is obtained as coefficients of respective frequencies, and when a difference between coefficients is obtained, it is equivalent to obtaining a difference between the frequency components.

In step S107, the region determination unit 108 determines whether the determination target region is a moving body region in which a difference with a background image is generated since a person is imaged or other regions including a background region, based on the difference information of each region obtained by the difference calculation unit 107. Determination processing is performed by an arithmetic operation of difference information for each region and a determination parameter that is previously set in the region determination unit 108. The determination parameter may be obtained by mechanical learning such as a support vector machine. That is, a feature vector x (an M-dimensional row vector) corresponding to the number (M) of pixels which have a value of each block after the DCT processing as one feature quantity may be obtained by the support vector machine. When moving body determination parameters that are set in the region determination unit 108 are denoted by a (an M-dimensional column vector) and b, the region determination unit 108 performs determination processing using formula (1):

$$a*x-b \tag{1}$$

More specifically, the region determination unit 108 determines that the determination target region is the moving body region when a value of formula (1) is positive and determines that the determination target region is the background region when a value of formula (1) is not positive. Formula (1) is applicable to a case in which learning has been performed by a linear support vector machine, and a non-linear support vector machine which performs a kernel operation may be used. Other learning methods may also be used. For learning, a plurality of pieces of DCT processed data corresponding to a moving body by a person and a plurality of pieces of DCT processed data corresponding to a line image and a background are prepared from an image captured by the imaging unit 101 in advance when the imaging unit 101 is installed, and a object determination parameter is obtained.

In step S108, if the region determination unit 108 determines that the determination target region is a background region, the processing proceeds to step S109. If the region determination unit 108 determines that the determination target region is a moving body region, the processing proceeds to step S110.

With the above-described processing, a line image region can also be determined as a background region, and a moving body region can be discriminated from a line image region.

In step S109, the background image updating unit 109 combines the region of the input image that is determined as a background region by the region determination unit 108 with a region of the same location of the background image stored in the background image storage unit 104, based on information determined by the region determination unit 108. The background image updating unit 109 does not combine the region determined as a moving body region but combines the region determined as a background region with a corresponding region of the background image stored in the background image storage unit 104. Accordingly, the moving body is not projected to the background image stored in the background image storage unit 104, and an image of only a background can always be maintained. The background image updating unit 109 combines a background region of the input image with a region of the same location of the background image stored in the background image storage unit 104, for example, at a ratio that is previously set. For example, the background image updating unit 109 combines the regions at a ratio of:

$$\text{"input image"}:\text{"background image"}=\alpha:1-\alpha(0\leq\alpha\leq1). \quad (2)$$

Combining refers to processing for adding pixel values of the same pixel location of the input image and the background image stored in the background image storage unit 104 at a predetermined ratio and using the obtained value as a pixel value of the same pixel location of a new background image. A pixel value of the new background image is obtained by "α×(pixel value of the input image)+(1−α)×(pixel value of the background image)". When α is set to a larger value, the ratio of the input image to the background image increases, so that the reflection degree of the input image increases. When α is set to a smaller value, the ratio of the input image to the background image decreases, so that the reflection degree of the input image decreases. Therefore, for example, an operator can operate an operation panel of the image processing apparatus to adjust and input (or set) the ratio α, so that an update reflection degree can be adjusted to a desired state. The background image updating unit 109 performs combining processing for all pixels determined as a background region and, then, stores pixel values of the background region after combining in a region of the same location of the background image stored in the background image storage unit 104.

In step S110, for example, the background image updating unit 109 determines whether processing in step S105 and subsequent steps have been performed for all of the regions of the input image. The background image updating unit 109 proceeds to step S111 when it is determined that processing in step S105 and subsequent steps have been performed for all of the regions of the input image, and returns processing to step S105 when it is determined that processing in step S105 and subsequent steps have not been performed for all of the regions of the input image. In step S105, the DCT unit 106 selects and extracts a next processing target region and performs the DCT processing.

Processing of image combining is performed for all of the background regions of the input image, and the combined image is stored as the background image in the background image storage unit 104, so that the background image can be updated to the latest background image.

Next, in step S111, before transmitting the latest background image stored in the background image storage unit 104 to the display side, the combining unit 110 combines the latest background image with the input image at a ratio, for example, that is previously determined or set. When the latest background image is combined with the input image, there is an effect of making the moving body region emerge. For example, the combining unit 110 may combine the images at a ratio of $$\text{"input image"}:\text{"background image"}=\beta:1-\beta(0\leq\beta\leq1). \quad (3)$$

Figure 5A:
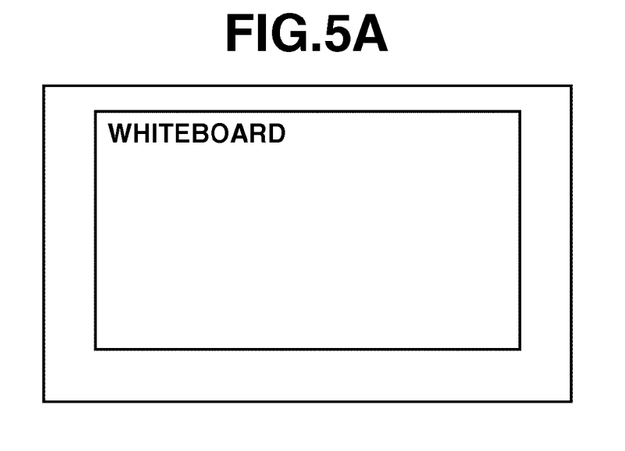
FIGS. 5A to 5C are views each illustrating an example of an image transmitted to a display side.

The combining unit 110 adds pixel values of the same pixel location of the input image and the latest background image stored in the background image storage unit 104 at a predetermined (set) ratio and uses the obtained value as a pixel value of the same pixel location of a new image, similar to processing performed by the background image updating unit 109. A value of β may be adjusted to delete the moving body region or make the moving body region translucent. For example, when the operator sets a value of β to 0, a pixel value of the input image is not reflected at all, and an image generated as a combining result is identical to the latest background image, and thus the latest background image is transmitted to the display side (FIG. 5A). FIGS. 5A to 5C are views each illustrating an example of an image transmitted to the display side.

Figure 5B:
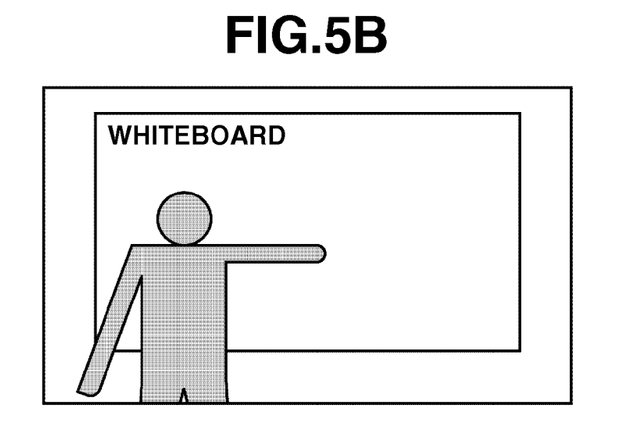
Figure 5C:
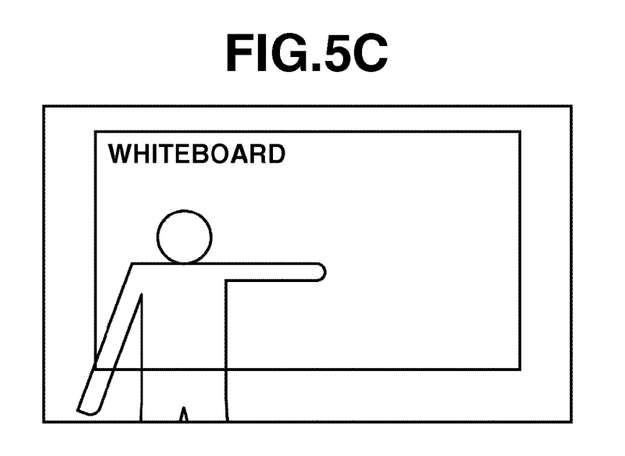

Further, for example, when the operator sets a value of β to 1, a pixel value of the background image is not reflected at all, and a generated image is the input image "as is", and thus the input image is transmitted to the display side "as is" (FIG. 5B). Further, when the operator sets a value of β within a range of 0<β<1, a pixel value of the input image is reflected, and a generated image has a moving body, for example, a person which is translucently projected (FIG. 5C).

As described above, the form of a display image can be arbitrarily adjusted by adjusting a value of β like an image of only a background, image of an input image "as is" or an image in which a moving body region is translucent. In the present exemplary embodiment, the input image and the background image are combined, but when the input image and the background image need to be switched and displayed, a unit configured to switch an image to be displayed may be provided in the image processing apparatus or in the display side instead of the combining unit.

In step S112, the transmission unit 111 transmits the image generated by the combining unit 110 to the display side. In the display side, the reception unit 112 receives the combined image or, for example, the latest background image. The display unit 113 displays the image received by the reception unit 112.

The image processing apparatus 100 performs the above-described processing for each frame of an image captured by the imaging unit 101.

Figure 6:
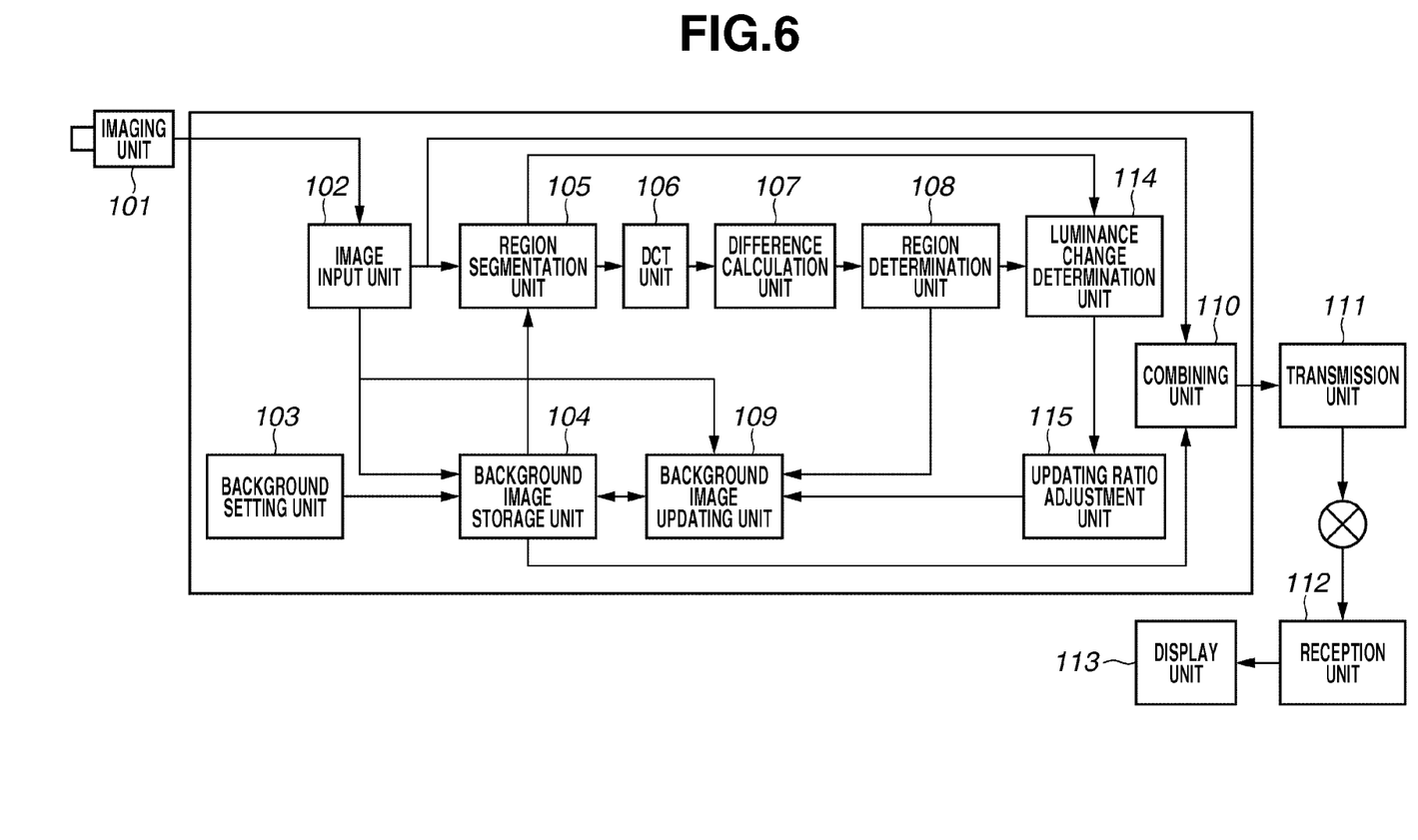
FIG. 6 is a view illustrating an example of a configuration of a video conference system according to a second exemplary embodiment of the present invention.

FIG. 6 is a view illustrating an example of a configuration of a video conference system according to a second exemplary embodiment of the present invention. In the video conference system according to the present exemplary embodiment, similar to the first exemplary embodiment, an imaging unit 101, an image processing unit 100, and a transmission unit 111 are connected to a display side via a network.

When a line image is added onto the whiteboard, the display side may desire to see the added information as soon as possible, while when the line image is deleted, the display side may desire to remain the deleted information for a while in contrast to the added information. This is because it is expected that visibility may be improved when the deleted line image remains for a while.

Points different from the above-described exemplary embodiment will be described below.

Compared to the image processing apparatus 100 of the above-described exemplary embodiment, the image processing apparatus 100 of the present exemplary embodiment further includes a luminance change determination unit 114 and an updating ratio adjustment unit 115 as hardware configurations. Further, as described above, the functions may be implemented in the image processing apparatus as software (a program) executed by a CPU.

The luminance change determination unit 114 determines (detects) a luminance change of the input image and the background image stored in the background image storage unit 104. The updating ratio adjustment unit 115 adjusts a parameter in the background image updating unit 109 based on a determination result by the luminance change determination unit 114.

Figure 7:
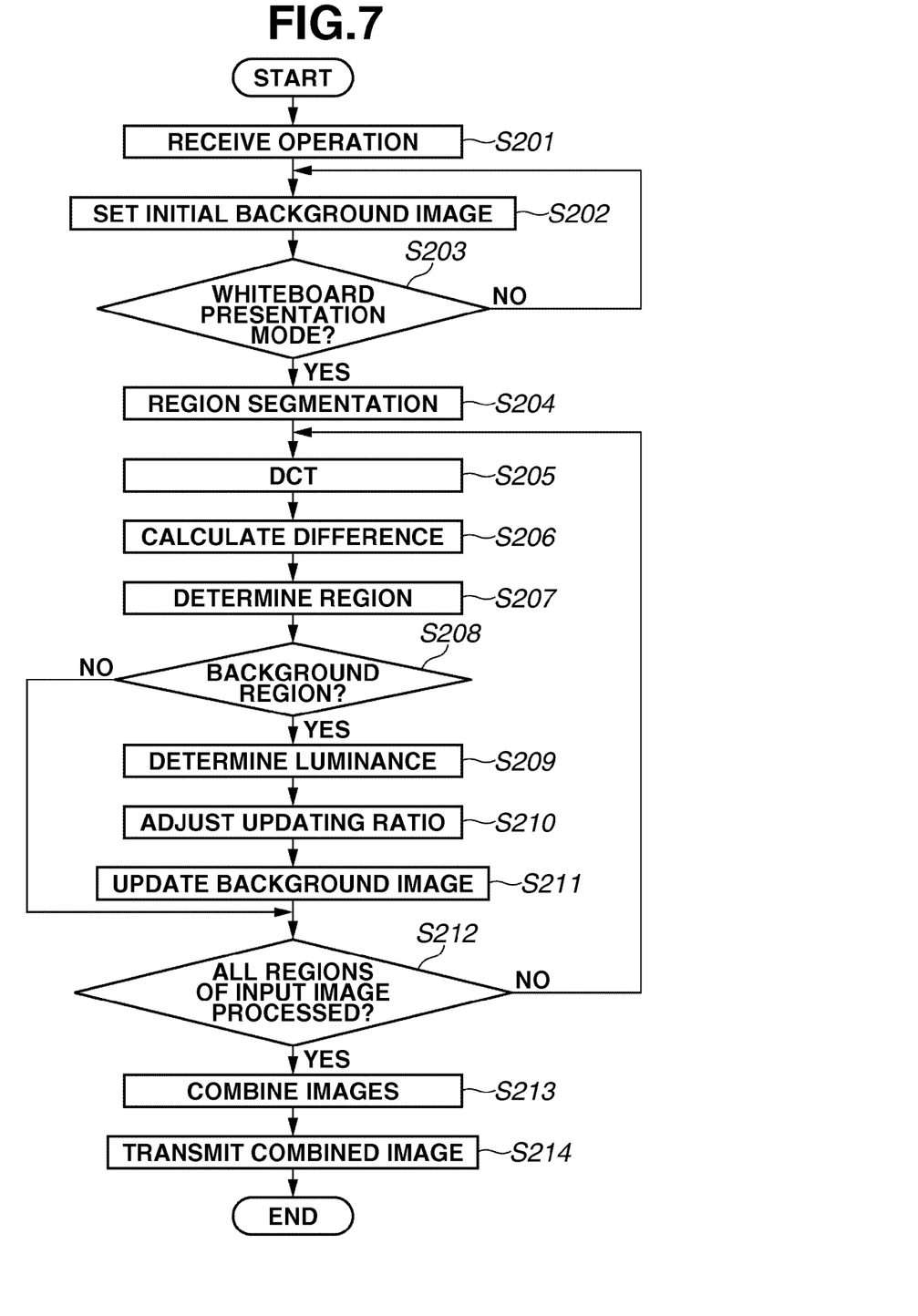
FIG. 7 is a flowchart illustrating an example of processing performed by an image processing apparatus according to the second exemplary embodiment.

FIG. 7 is a flowchart illustrating an example of processing performed by the image processing apparatus according to the second exemplary embodiment.

Processing from step S201 to step S208 is similar to processing from step S101 to step S108 of FIG. 2 of the first exemplary embodiment, and thus description thereof will not be repeated in the present exemplary embodiment.

In step S209, after determination about whether the determination target region is a moving body region or a background region is performed, the luminance change determination unit 114 compares the processing target region of the input image determined as a background region and a region of the same location of the background image stored in the background image storage unit 104 to determine (detect) a luminance change. For example, the luminance change determination unit 114 obtains a luminance difference between pixels of the same pixel location of respective regions of the input image and the background image to determine a luminance change. The luminance change determination unit 114 determines the determination target region as a region in which the line image is added to the whiteboard when luminance of the input image becomes darker than the background image, while the luminance change determination unit 114 determines the determination target region as a region in which the line image on the whiteboard is deleted when luminance of the input image becomes brighter than the background image.

In step S210, the updating ratio adjustment unit 115 acquires luminance change information (the determination result) from the luminance change determination unit 114 and automatically adjusts an updating ratio α between a background region of the input image and a corresponding region of the background image stored in the background image storage unit 104 to α1 when luminance of the input image becomes darker than the background image. Further, in step S210, when luminance of the input image becomes brighter than the background image, the updating ratio adjustment unit 115 determines that the line image on the whiteboard is deleted and automatically adjusts the updating ratio α to α2. The updating ratio adjustment unit 115 may set α1>α2 (4). In this case, when the line image is added, the line image can rapidly be reflected in the background image, and when the line image is deleted, the deleted line image can be slowly updated.

In step S211, the background image updating unit 109 combines a region of the input image determined by the region determination unit 108 with a region of the same location of the background image stored in the background image storage unit 104, based on information determined by the region determination unit 108 and the updating ratio adjusted by the updating ratio adjustment unit 115.

Processing from step S212 to step S214 is similar to processing from step S110 to step S112 of FIG. 2 of the first exemplary embodiment, and thus description thereof will not be repeated.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-260897 filed Oct. 7, 2008, which is hereby incorporated by reference herein in its entirety.

What is claimed is:

1. An image processing apparatus comprising:
an image input unit configured to input an image;
a region determination unit configured to obtain a difference between a partial region of an input image input by the image input unit and a partial region of a background image, stored in a storage device, corresponding to the partial region of the input image and to determine whether each partial region of the input image is a moving body region or a background region based on the difference; and
a synthesizing unit configured to synthesize the partial region of the input image determined as the background region by the region determination unit and the partial region of the background image corresponding to the background region of the input image by calculating respective pixel values of corresponding regions; and
an updating unit configured to update a partial region the background image corresponding to the background region of the input image by the synthesized image for the background region.

2. The image processing apparatus according to claim 1, further comprising an image combining unit configured to combine the input image and the background image updated by the updating unit.

3. The image processing apparatus according to claim 2, further comprising a transmission unit configured to transmit a combined image generated by the image combining unit.

4. The image processing apparatus according to claim 1, wherein the region determination unit transforms the respective partial regions of the input image and the background image into spatial-frequency components, obtains a difference between the spatial-frequency component of the partial region of the input image and the spatial-frequency component of the partial region of the background image corresponding to the partial region of the input image, and determines whether each partial region of the input image is the moving body region or the background region based on the difference.

5. The image processing apparatus according to claim 1, further comprising:
a luminance change determination unit configured to compare the partial region of the input image determined as the background region by the region determination unit with the partial region of the background image corresponding to the partial region of the input image to determine a luminance change; and a setting unit configured to set a combining ratio used for combining by the updating unit based on the luminance change determined by the luminance change determination unit.

6. The image processing apparatus according to claim 1, wherein the image input unit receives and inputs an image captured by an imaging unit from the imaging unit.

7. The image processing apparatus according to claim 1, further comprising a background image setting unit configured to receive an image composed only of a whiteboard captured by the imaging unit from the imaging unit and to store the received image as an initial background image in the storage device.

8. The image processing apparatus according to claim 1, wherein the synthesizing unit synthesizes the partial region of the input image determined as the background region by the region determination unit and the partial region of the background image corresponding to the partial region of the input image at a set synthesizing ratio to update the background image.

9. An image processing method performed by using a processor, the method comprising:

inputting an image;

obtaining a difference between a partial region of an input image and a partial region of a background image, stored in a storage device, corresponding to the partial region of the input image and determining whether each partial region of the input image is a moving body region or a background region based on the difference; and synthesizing the partial region of the input image determined as the background region and the partial region of the background image corresponding to the background region of the input image by calculating respective pixel values of corresponding regions; and updating a partial region of the background image corresponding to the background region of the input image by the synthesized image for the background region.

10. A computer-readable storage medium storing a program for instructing a computer to implement the image processing method according to claim 9.

* * * * *